United States Patent [19]
Sears

[11] Patent Number: 6,098,101
[45] Date of Patent: Aug. 1, 2000

[54] METHOD AND APPARATUS FOR GENERATING SHARED MODEM USAGE REPORTS IN A NETWORKED COMPUTER SYSTEM

[75] Inventor: Thomas R. Sears, Ontario, Oreg.

[73] Assignee: Micron Electronics, Inc., Nampa, Id.

[21] Appl. No.: 08/989,205

[22] Filed: Dec. 11, 1997

[51] Int. Cl.[7] .................................................. G06F 15/173
[52] U.S. Cl. .......................... 709/224; 709/202; 709/223; 709/227; 709/228
[58] Field of Search ........................... 395/200.3–200.33, 395/200.53–200.59, 583–654; 379/112–116, 130–135, 265–266; 709/200–204, 223–229, 217–220; 370/351–352, 400–401

[56] References Cited

U.S. PATENT DOCUMENTS

| | | | |
|---|---|---|---|
| 5,168,515 | 12/1992 | Gechter et al. ........................... | 379/265 |
| 5,463,625 | 10/1995 | Yasrebj .................................... | 709/304 |
| 5,719,926 | 2/1998 | Hill ......................................... | 379/113 |
| 5,734,706 | 3/1998 | Windsor et al. ......................... | 379/142 |
| 5,737,333 | 4/1998 | Civanlar et al. ......................... | 370/352 |
| 5,754,634 | 5/1998 | Kay et al. ................................ | 379/134 |
| 5,799,073 | 8/1998 | Fleischer, III et al. .................. | 379/113 |
| 5,862,203 | 1/1999 | Wulkan et al. .......................... | 379/114 |
| 5,949,411 | 9/1999 | Doerr et al. ............................. | 709/219 |
| 5,956,485 | 9/1999 | Perlman .................................. | 709/204 |
| 5,983,273 | 11/1999 | White et al. ............................. | 709/229 |
| 5,987,430 | 11/1999 | Van Horne et al. ..................... | 709/203 |
| 6,023,507 | 2/2000 | Wookey .................................. | 709/224 |
| 6,032,184 | 2/2000 | Cogger et al. .......................... | 709/223 |

*Primary Examiner*—Zarni Maung
*Assistant Examiner*—Bharat Barot
*Attorney, Agent, or Firm*—Dorsey & Whitney LLP

[57] ABSTRACT

A report generation method and system in a networked computer system. The networked computer system has a shared modem pool, networked computers, and a server computer that is connected to the modems through physical ports and that is connected to the networked computers through a local area network. The reporting system produces reports about incoming calls received by the modems and transmitted to the server computer, about outgoing calls collected by the server computer from the networked computers and transmitted by the server computer to the modems, and about error conditions that arise in the system from modem-associated activities.

25 Claims, 8 Drawing Sheets

|         | Date    | Time        | Source | Category       | Event | User   | Device |
|---------|---------|-------------|--------|----------------|-------|--------|--------|
|         | 9/17/97 | 11:56:32pm  | RAS    | com            | 32    | user 8 | 2      |
|         | 9/17/97 | 11:56:48pm  | SAPS   | com            | 16    | user 1 | 1      |
|         | 9/17/97 | 11:57:05pm  | SAPS   | com            | 16    | user 5 | 2      |
|         | 9/17/97 | 11:57:45pm  | OS     | virtual memory | 16384 | n/a    | n/a    |
|         | 9/17/97 | 11:58:02pm  | SAPS   | com            | 8192  | user 4 | 3      |
|         | 9/17/97 | 11:58:03pm  | RAS    | com            | 16    | user 6 | 3      |
|         | 9/17/97 | 11:59:55pm  | SAPS   | com            | 32    | user 1 | 1      |
|         | 9/17/97 | 11:59:59pm  | OS     | peripheral     | 32768 | n/a    | 413    |
|         | 9/18/97 | 12:00:03am  | SAPS   | com            | 8192  | user 2 | 1      |
|         | 9/18/97 | 12:00:25am  | SAPS   | com            | 16    | user 2 | 1      |
|         | 9/18/97 | 12:00:39am  | RAS    | com            | 32    | user 6 | 3      |
|         | 9/18/97 | 12:01:10am  | RAS    | com            | 16    | user 8 | 3      |
|         | 9/18/97 | 12:01:51am  | SAPS   | com            | 128   | user 1 | 1      |
|         | 9/18/97 | 12:01:52am  | RAS    | com            | 128   | n/a    | n/a    |
|         | 9/18/97 | 12:02:16am  | OS     | scheduler      | 8192  | n/a    | n/a    |
|         | 9/18/97 | 12:02:48am  | RAS    | com            | 32    | user 8 | 3      |
|         | 9/18/97 | 12:03:33am  | RAS    | com            | 16    | user 7 | 3      |
|         | 9/18/97 | 12:04:02am  | SAPS   | com            | 32    | user 2 | 1      |
|         | 9/18/97 | 12:04:41am  | SAPS   | com            | 32    | user 5 | 2      |

Fig. 3

INCOMING PORT USAGE

| User | Port | Time In | Time Out | Elapsed | Bytes |
|---|---|---|---|---|---|
| user 8 | 2 | 11:53:28pm | 11:56:32pm | 3:04 | 211,684 |
| user 6 | 3 | 11:58:03pm | 12:00:39am | 2:36 | 182,113 |
| user 8 | 3 | 12:01:10am | 12:02:48am | 1:38 | 110,361 |
| user 7 | 3 | 12:03:33am | 12:08:43am | 5:10 | 364,318 |

*Fig. 4*

OUTGOING PORT USAGE

| User | Port | Start | End | Elapsed | Bytes Transferred |
|---|---|---|---|---|---|
| user 1 | 1 | 11:56:48pm | 11:59:55pm | 3:07 | 220,377 |
| user 5 | 2 | 11:57:05pm | 12:04:41am | 7:36 | 516,645 |
| user 2 | 1 | 12:00:25am | 12:04:02am | 3:37 | 297,116 |

*Fig. 5*

USER PERFORMANCE

| User | Num Incoming | Average Time | Average Bytes | Num Outgoing | Average Time | Average Bytes | Num Errors |
|---|---|---|---|---|---|---|---|
| user 1 | 0 | 0 | 0 | 1 | 3:07 | 220,377 | 1 |
| user 2 | 0 | 0 | 0 | 1 | 3:37 | 297,116 | 1 |
| user 3 | 0 | 0 | 0 | 0 | 0 | 0 | 0 |
| user 4 | 0 | 0 | 0 | 0 | 0 | 0 | 1 |
| user 5 | 0 | 0 | 0 | 1 | 7:36 | 516,645 | 0 |
| user 6 | 1 | 2:36 | 182,113 | 0 | 0 | 0 | 0 |
| user 7 | 0 | 0 | 0 | 0 | 0 | 0 | 0 |
| user 8 | 2 | 2:21 | 161,023 | 0 | 0 | 0 | 0 |

*Fig. 6*

ACCESS DENIED

| User | Date | Time | Problem |
|---|---|---|---|
| user 4 | 9/17/97 | 11:58:02pm | incorrect password |
| user 2 | 9/18/97 | 12:00:03am | incorrect password |
| user 1 | 9/18/97 | 12:01:51am | no modems available |
|  |  |  |  |

*Fig. 7*

EVENTS

| User | Date | Port | Time1 | Time2 | Total_Time | Bytes | Etype | Enum |
|---|---|---|---|---|---|---|---|---|
| user 8 | 9/17/97 | 2 | 11:52:28pm | 11:56:32pm | 4:04 | 211,684 | RAS | 1 |
| user 1 | 9/17/97 | 1 | 11:56:48pm | 11:59:55pm | 3:07 | 220,337 | SAPS | 1 |
| user 5 | 9/17/97 | 2 | 11:57:05pm | 12:04:41am | 7:36 | 516,645 | SAPS | 1 |
| user 4 | 9/17/97 | 3 | 11:58:02pm | | | | SAPS | 13 |
| user 6 | 9/17/97 | 3 | 11:58:03pm | 12:00:39am | 2:33 | 182,113 | RAS | 1 |
| user 2 | 9/18/97 | 1 | 12:00:03am | | | | SAPS | 13 |
| user 2 | 9/18/97 | 1 | 12:00:25am | 12:04:02am | 3:37 | 297,116 | SAPS | 1 |
| user 8 | 9/18/97 | 3 | 12:01:10am | 12:02:48am | 3:38 | 110,361 | RAS | 1 |
| user 1 | 9/18/97 | 1 | 12:01:51am | | | | SAPS | 9 |
| | 9/18/97 | | 12:01:52am | | | | RAS | 9 |
| user 7 | 9/18/97 | 3 | 12:03:33am | 12:08:43am | 5:10 | 364,318 | RAS | 1 |

*Fig. 10*

EVENT NAMES

| Enum | Name |
|---|---|
| 1 | normal connection |
| 2 | interrupted connection |
| 3 | modem transfer error |
| 4 | RAS process error |
| 5 | SAPS process error |
| 6 | network error |
| 7 | server error |
| 8 | client error |
| 9 | no modems available |
| 10 | incomplete number |
| 11 | wrong area code |
| 12 | number not in service |
| 13 | incorrect password |

*Fig. 11*

METHOD AND APPARATUS FOR GENERATING SHARED MODEM USAGE REPORTS IN A NETWORKED COMPUTER SYSTEM

TECHNICAL FIELD

The present invention relates to data collection and report generation and, in particular, to the collection and reporting of port usage in a shared modem pool managed by a remote access server.

BACKGROUND OF THE INVENTION

A remote access server program ("RAS") running on a server computer provides logical dial-in ports to remote computers. A remote computer accesses the RAS program via a remote modem connected to the remote computer. The remote modem transmits data through a telecommunications line to a server modem connected to the server computer. The server computer manages a pool of server modems that receive data from the telecommunications line and transmit that data to the server computer and that receive data from the server computer and transmit the data through the telecommunications line. Each modem in the pool of server modems exchanges data with the server computer through a physical port on the server computer. The RAS running on the server computer allows the remote computers access to the resources of a local area network to which the server computer is connected. Using this access to the local area network, users employing the remote computers can exchange data with computers attached to the local area network and use resources shared with the computers attached to the local area network.

A Sparta-Com asynchronous port sharing program ("SAPS"), also running on the server computer, is able to share logical ports with RAS and provide the shared logical ports to computers attached to the local area network, called networked computers, for data transmission. The SAPS provides users running on networked computers with the ability to dial out over a telecommunications line to remote computers as if each of the networked computers was directly connected to a modem. The SAPS can provide these server modems to a larger number of networked computers than the number of modems, or ports, available on the server computer, assuming that not all the networked computers need access to a server modem at the same time.

FIG. 1 displays a schematic diagram of data transfer facilitated by RAS and SAPS. In FIG. 1, five networked personal computers ("PCs") 101–105 are connected through a local area network 106 to a server computer 107. Five different users, user 1–user 5, are using the five networked personal computers. The server computer includes both a RAS 108 and a SAPS 109. The server computer is connected to three modems 110–112 (i.e., a modem pool) which are, in turn, connected to a telephone line 113. Each networked PC in FIG. 1 is connected through a separate logical network connection to the RAS and to the SAPS. For example, user 1 101 is connected to the RAS 108 through network connection 114 and is connected to the SAPS 109 through network connection 115. It appears to each networked computer, or user, in FIG. 1 that that computer has a dedicated, unshared physical port connection to a modem for outgoing data transfer. The SAPS running on the server computer provides this appearance of a dedicated physical port for outgoing calls to each of the networked PCs. In fact, the networked PCs are all sharing the small number of modems managed by the server computer. User 1, for example, might transfer data to three different remote computers through calls connected through modems 110, 111, and 112 in succession. From user 1's standpoint, however, it appears that all three calls were transmitted through a single modem connected to the logical port provided by the SAPS.

Systems of networked computers that share a pool of modems through the RAS and SAPS intermediaries, such as the system shown in FIG. 1, are managed and maintained by system administrators. The system administrator monitors the usage of the modems to detect overload conditions that require additional modems to be added to the system and to detect failed modems that are not processing incoming and outgoing data transfers at an acceptable level. In order to detect such problems the system administrator uses automated and manual tools for processing and examining a timeline of modem-related events.

FIG. 2 displays an example timeline of events for a server computer including a RAS and a SAPS. The vertical axis of FIG. 2 is a timeline 201. This example timeline extends from 11:56 p.m. on Sep. 17, 1997 through midnight to 12:05 a.m. on Sep. 18, 1997. Various events 202–219 are recorded along the timeline, including RAS-generated events, SAPS-generated events, and operating system events. For example, event 202 that occurs at 11:56:32 p.m. represents user 8 hanging up, or disconnecting, an incoming call. Event 203 that occurs at 11:56:48 p.m. represents user 1 initiating an outgoing telephone call. The data contained in this example timeline of FIG. 2 will be used throughout the following discussion and examples.

A system administrator typically does not have the capacity to manually record the series of events that occur in various time intervals within the server computer. The example of FIG. 2, for instance, shows a time interval of merely nine minutes for the small system of FIG. 1. The system administrator would normally require monitoring over days or weeks in order to collect sufficient data to make many of the determinations that are required for adequately managing and maintaining the system. System tools are provided by operating system vendors like, for example, the Windows NT Event Viewer. These tools identify and record network and operating system events over a selected time interval. Various filtering mechanisms are provided by these tools in order to capture some subset of the total number of different types of events that might occur.

FIG. 3 displays an example output from an Event Viewer for the events recorded from the timeline of FIG. 2. The Event Viewer displays, for each event, the date 301, time 302, the component that produced the event 303, a general category for the event 304, a number representing the specific event 305, a designation for the user associated with the event 306, and the device number of the device associated with the event 307. The Event Viewer displays additional information, including the number of bytes transferred during the event and an indication of the computer on which the event occurred. These additional data are contained in additional columns of the Event Viewer output, starting with column 308, but not shown in FIG. 3. The Event Viewer output of FIG. 3 essentially represents the data contained in FIG. 2 in table form. For example, event 203 in FIG. 2 corresponds to entry 309 in FIG. 3. The value for the event column in entry 309, "16," represents the making of an outgoing call. That call extends in time to entry 310, where the value in the event column, "32," represents user 1 disconnecting the outgoing call. The Event Viewer assigns various other numerical values to the different possible normal and error conditions that arise during the course of the system operation. For example, event 206 in FIG. 2 represents a user's unsuccessful attempt to make a connection using an incorrect password. That event is represented in FIG. 3 by entry 311, where the value in the event column, "8192," represents an incorrect password error. The device numbers in column 307 for all entries having a value in the source column equal to 'RAS' or 'SAPS' represent the number of the modem associated with the event, of which there are three, as shown in FIG. 1.

Although useful, the Event Viewer output does not represent an easy-to-use medium for system administration purposes. A system administrator desires various generalized reports of modem usage and the amount of logical port usage by various users, among other things. Extracting that information from the Event Viewer involves tedious manual data extraction and hand calculations. The example timeline of FIG. 2 and Event Viewer display of FIG. 3 are for a very small system, displayed in FIG. 1, over a very short interval of time. In actuality, a network system may have tens to hundreds of networked computers sharing a modem pool of many tens of modems. The system administrator needs to display usage information generated from Event Viewer monitoring that spans many hours or even days. The Event Viewer output over such time intervals might well comprise many hundreds of pages, from which the system administrator would have to spend days to extract and compile the information needed for maintenance and management of a network system.

As an aid to the system administrator, a RAS output generator has been developed. This RAS output generator collects data stored within an Event Viewer and compiles certain of the data into an Incoming Port Usage Report. FIG. 4 displays an example Incoming Port Usage Report for the data contained in FIG. 3. The Incoming Port Usage Report displays an entry for each completed data transfer through the RAS software component of the server computer. Each entry includes an identification of the user which made the incoming call 401, an indication of the modem through which the data was received by the system 402, the time at which the incoming call was received and the time at which the incoming call was completed 403 and 404, the total elapsed time of the call 405, and the number of bytes transferred during the call 406. Assuming that the number of bytes transferred is stored and made available in the additional columns not shown in FIG. 3 of the Event Viewer display, the Incoming Port Usage Report can be generated from the Event Viewer output in a single pass through the entries of the Event Viewer output.

Although more useful than the unprocessed Event Viewer output, the RAS output generator does not provide sufficient information for effective system administration of a system such as that shown in FIG. 1. A system administrator generally wants to collect and compile data about outgoing calls through the SAPS component of the server in addition to incoming calls managed by the RAS component of the server. However, the RAS output generator only collects and compiles information for incoming calls. Furthermore, the system administrator would like to be able to generate reports both from data stored within the Event Viewer, as well as from data archived in data files by previous instantiations of the Event Viewer. The RAS output generator can only collect data stored within the Event Viewer and cannot process files containing archived Event Viewer data. Finally, a system administrator would like to compile a variety of different reports depending on the types of problems and characteristics of the network that the system administrator is seeking to identify. The RAS output generator provides only the static Incoming Port Usage Report as shown in FIG. 4. It does not provide additional static reports, nor does it provide to the system administrator the ability to define and generate reports tailored to the system administrator's particular needs.

SUMMARY OF THE INVENTION

An embodiment of the present invention is directed to a report generation method and system in a networked computer system. The networked computer system has a shared modem pool, networked computers, and a server computer that is connected to the modems through physical ports and that is connected to the networked computers through a local area network. The reporting system produces reports about incoming calls received by the modems and transmitted to the server computer, about outgoing calls collected by the server computer from the networked computers and transmitted by the server computer to the modems, and about error conditions that arise in the system from modem-associated activities. The reporting system collects information about incoming and outgoing calls and error conditions, stores the information in a database, and generates the reports from the information stored in the database.

BRIEF DESCRIPTION OF THE DRAWINGS

FIG. 3 displays an example output from an Event Viewer for the events recorded on the timeline of FIG. 2.

FIG. 4 displays an example conventional Incoming Port Usage Report for the data contained in FIG. 3.

FIG. 5 displays an Outgoing Port Usage Report.

FIG. 6 displays a User Performance Report.

FIG. 7 displays an Access Denied Report.

FIG. 10 displays the relational database table "Events."

FIG. 11 displays the relational database table "Eventnames."

DETAILED DESCRIPTION OF THE INVENTION

Figure 1:
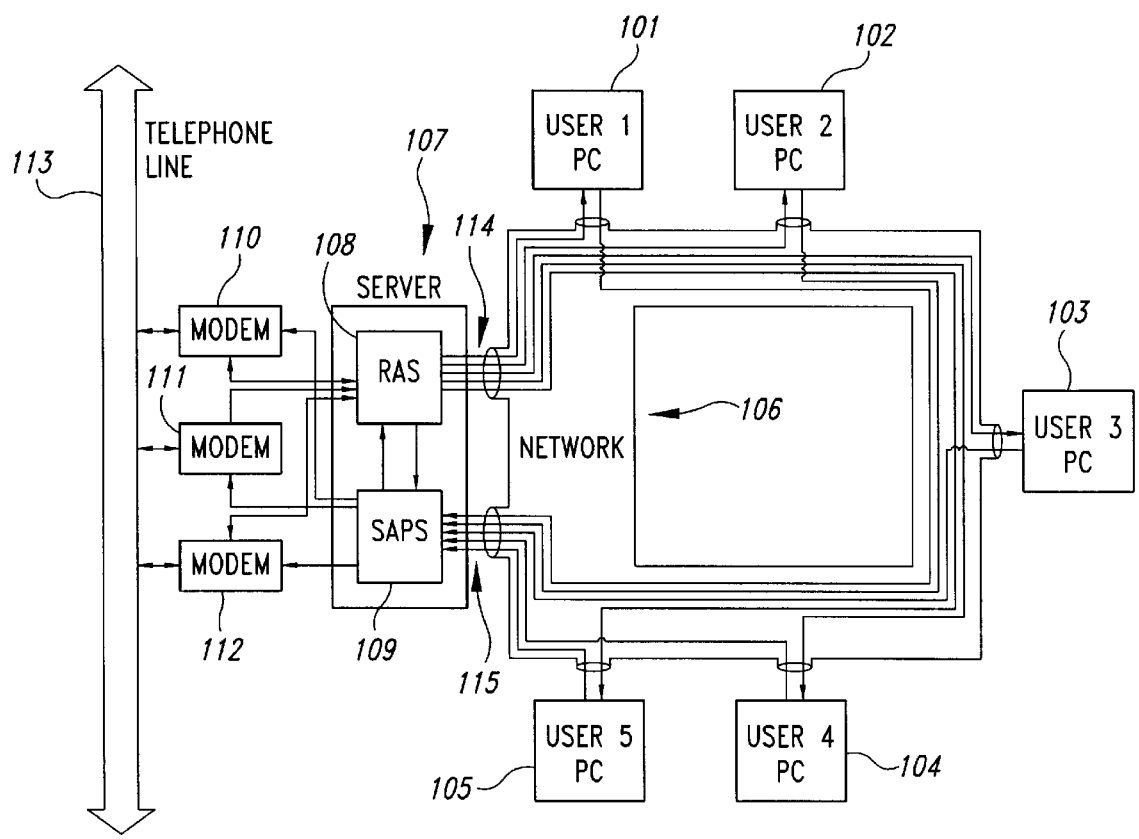
FIG. 1 displays a schematic diagram of data transfer facilitated by RAS and SAPS.

The present invention provides a reporting system for collecting and compiling data from an Event Viewer or from a file containing archived Event Viewer data, and producing from the compiled data a variety of different reports. The reporting system generates reports that are used by a system administrator to maintain and manage a system of remote and networked users that share, through services provided by the RAS and SAPS on a server computer, modems of a shared modem pool. The reporting system reads through the entries maintained in an Event Viewer or contained in a data file generated by an Event Viewer in a single pass and generates from the Event Viewer entries a database containing pertinent information extracted from the Event Viewer entries. The reporting system then can generate any of a variety of standard reports, as well as ad hoc reports, from the data collected and stored in the database.

FIGS. 5–9 display example reports generated by the reporting system. FIG. 5 displays an Outgoing Port Usage Report. The reporting system generates the Outgoing Port Usage Report from events that represent outgoing calls initiated by users of networked computers. Each entry in the Outgoing Port Usage Report of FIG. 5 includes values that identify the user that initiated the outgoing call 501, the modem through which the call was made 502, the times that the outgoing call was initiated and terminated 503 and 504, the total elapsed time of the call 505, and the number of bytes that were transferred during the call 506. Entry 507, for example, represents the call initiated by user 1 in event 203 of FIG. 2 and terminated by user 1 in event 208 of FIG. 2.

FIG. 6 displays a User Performance Report generated by the reporting system from the data contained in FIG. 3. For a particular interval of time, the User Performance Report shows, for each user, information about the incoming calls made by that user and the outgoing calls initiated by that user during the time interval. The User Performance Report displays, for each entry, an indication of the user that made an incoming call or initiated an outgoing call 601, the number of incoming calls made by the user 602, the average amount of elapsed time for incoming calls 603, the average number of bytes transferred by the user during the incoming calls 604, the number of outgoing calls initiated by the user 605, the average elapsed time for the outgoing calls 606, the average number of bytes transferred during the outgoing calls 607, and the number of errors generated by the user 608. Entry 609 of the User Performance Report shown in FIG. 6 displays the incoming and outgoing call data for user 1 over the timeline of FIG. 2. As can be seen from the values in entry 609, user 1 completed no incoming calls during the time interval and completed one outgoing call during the time interval that lasted three minutes and seven seconds and transferred 220,377 bytes. Note in the timeline of FIG. 2 that user 7 accepted an incoming call during the time interval, event 217, but that that incoming call was not completed during the time interval and thus does not show up in entry 610 in the User Performance Report of FIG. 6. As seen in entry 609, column 608 of the User Performance Report of FIG. 6, user 1 generated one error during the time interval. That error occurred as event 213 in FIG. 2, where, because all the modems were in use, user 1 could not obtain a modem in order to initiate an outgoing call.

FIG. 7 displays an Access Denied Report that indicates to the system administrator various error conditions that arise during a specific time interval and that generally relate to the inability of a user to gain access through the SAPS software component of the server computer to a modem. The Access Denied Report includes, for each entry, an indication of the identity of the user that suffered the access denial 701, the date and time that the access denial occurred 702 and 702, and a brief description of the type of denial that occurred 704. Entry 705 represents event 206 on the timeline of FIG. 2. User 4 was denied access to a modem by the SAPS software component at 11:58:02 p.m. on Sep. 17, 1997 because user 4 typed in an incorrect password.

Figure 2:
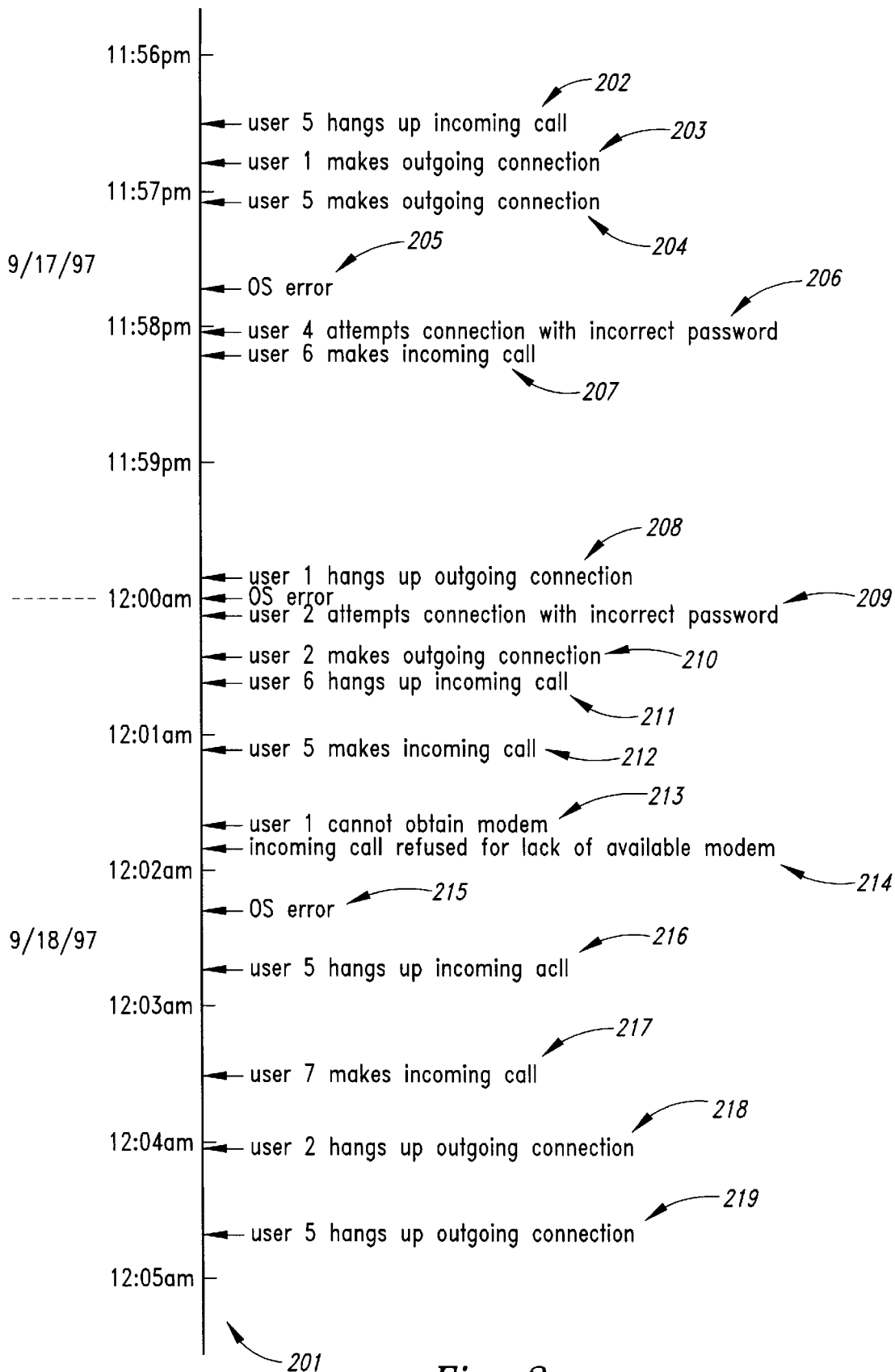
FIG. 2 displays an example timeline of events for a RAS and SAPS server.
Figure 8:
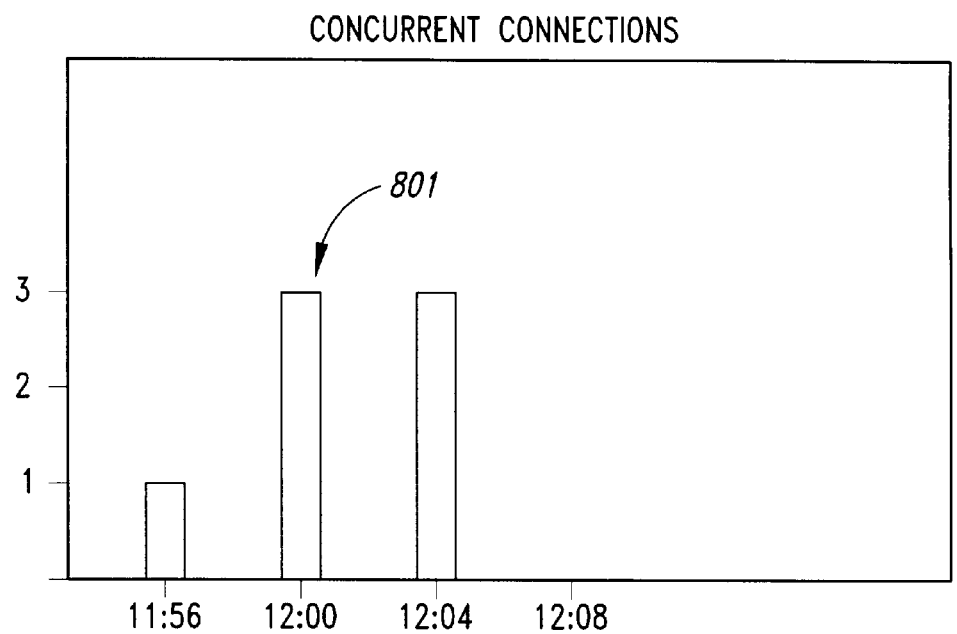
FIG. 8 displays an example of a Concurrent Connections Report.

FIG. 8 displays an example of a Concurrent Connections Report. This report is a bar graph showing the maximum number of modems concurrently in use over particular increments of time. FIG. 8 was generated, as with all the other reports shown in FIGS. 5–9, from the events of the timeline of FIG. 2. In FIG. 8, each bar shows a maximum number of concurrent connections that occurred over a four minute time interval. For example, bar 801 represents the maximum number of concurrent connections during the time interval between 11:56 p.m. and 12 midnight on Sep. 17, 1997. As can be seen in the timeline of FIG. 2, all three modems were simultaneously in use just after 11:58 p.m. when user 6 made an incoming call 207 after user 1 and user 5 had previously initiated outgoing calls 203–204. The Concurrent Connections Report would normally be constructed such that each bar represents a time interval on the order of an hour or more, so that the system administrator could see a clear graphical display of the percent of the modem pool concurrently in use over the course of many hours of system operation.

Figure 9:
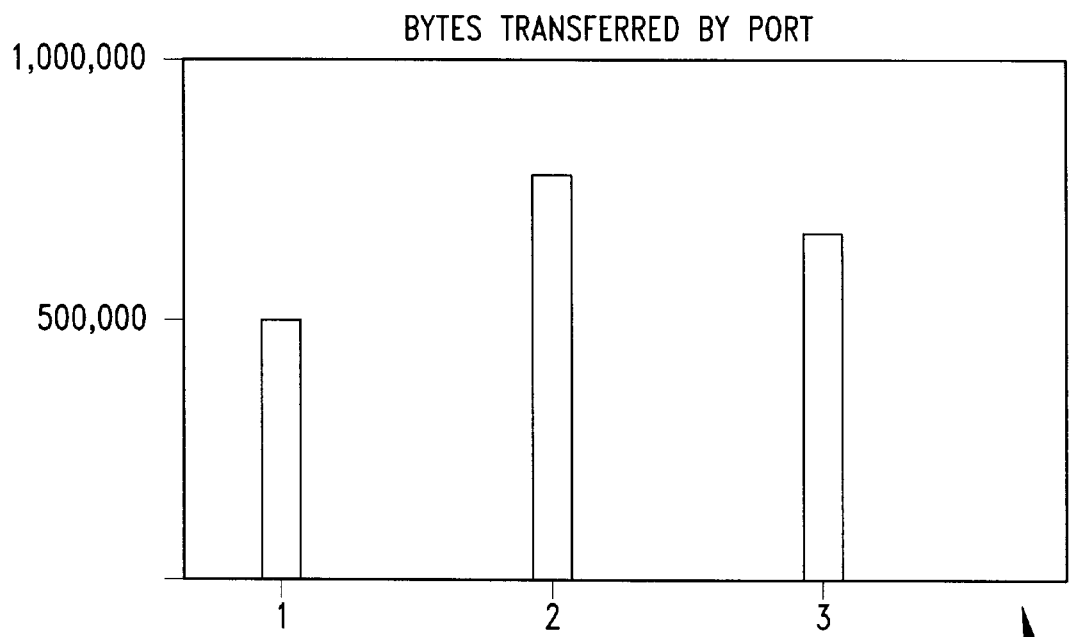
FIG. 9 displays a Bytes Transferred by Port Report.

FIG. 9 displays a Bytes Transferred by Port Report. For each port listed along the horizontal axis 901, the vertical bar associated with that port represents the number of bytes transferred through that port during some selected interval of time. The Bytes Transferred by Port Report of FIG. 9 was generated from the data contained in the timeline of FIG. 2 and the Event Viewer output of FIG. 3. Again, a system administrator would normally select a time interval on the order of hours in order to get a good time-averaged representation of the throughput for each modem. This report is useful for quickly picking out defective or failed modems.

One embodiment of the reporting system inputs the data collected and compiled from the Event Viewer into an Events relational database table. FIG. 10 displays the Events relational database table containing example data corresponding to the data in the Event Viewer output of FIG. 3. Each row in the Events relational database table represents a single incoming or outgoing call or an error event. The columns of the Events relational database table represent fields within each row, or entry. These fields include an indication of the user that initiated an event 1001, the date at which the event occurred 1002, the number of the modem associated with the event 1003, the time that the event began 1004, the time that the event ended 1005, the total elapsed time over which the event occurred 1006, the number of bytes transferred during the event 1007, the general type of the event 1008, and an indication of the specific event that occurred 1009. For example, row 1010 of FIG. 10 represents event 202 in the timeline of FIG. 2. This event represents an incoming call made by user 4 on Sep. 17, 1997 through modem 2. User 4 made the call at 11:52:28 p.m. and terminated the call at 11:56:32 p.m. The total elapsed time of the call was four minutes and four seconds and 211,684 bytes were transferred during the call. Because this was an incoming call, this was a RAS event, and since it was a successfully completed call, this call has the specific type indicated by the numeral "1" in the "Enum" column 1009.

FIG. 11 displays the relational database table "Eventnames."Eventnames essentially contains a map of associations between the values of the Enum column 1009 of the Events relational database table of FIG. 10 and brief English language descriptions of each type of event. Each row of the Eventnames relational database table describes one particular type of event that may occur in the system. Eventnames includes column "Enum" 1101 that contains the numerical value for the event and column "Name" 1102 that contains the English language description of the event. For example, row 1103 of Eventnames indicates that an event type value of 1 describes a normal connection. A normal connection could be a normally completed incoming call or a normally completed outgoing call. Note that the brief descriptions in column 704 of the Access Denied Report of FIG. 7 are taken directly from column "Name" 1102 of the Eventnames relational database table.

Figure 12:
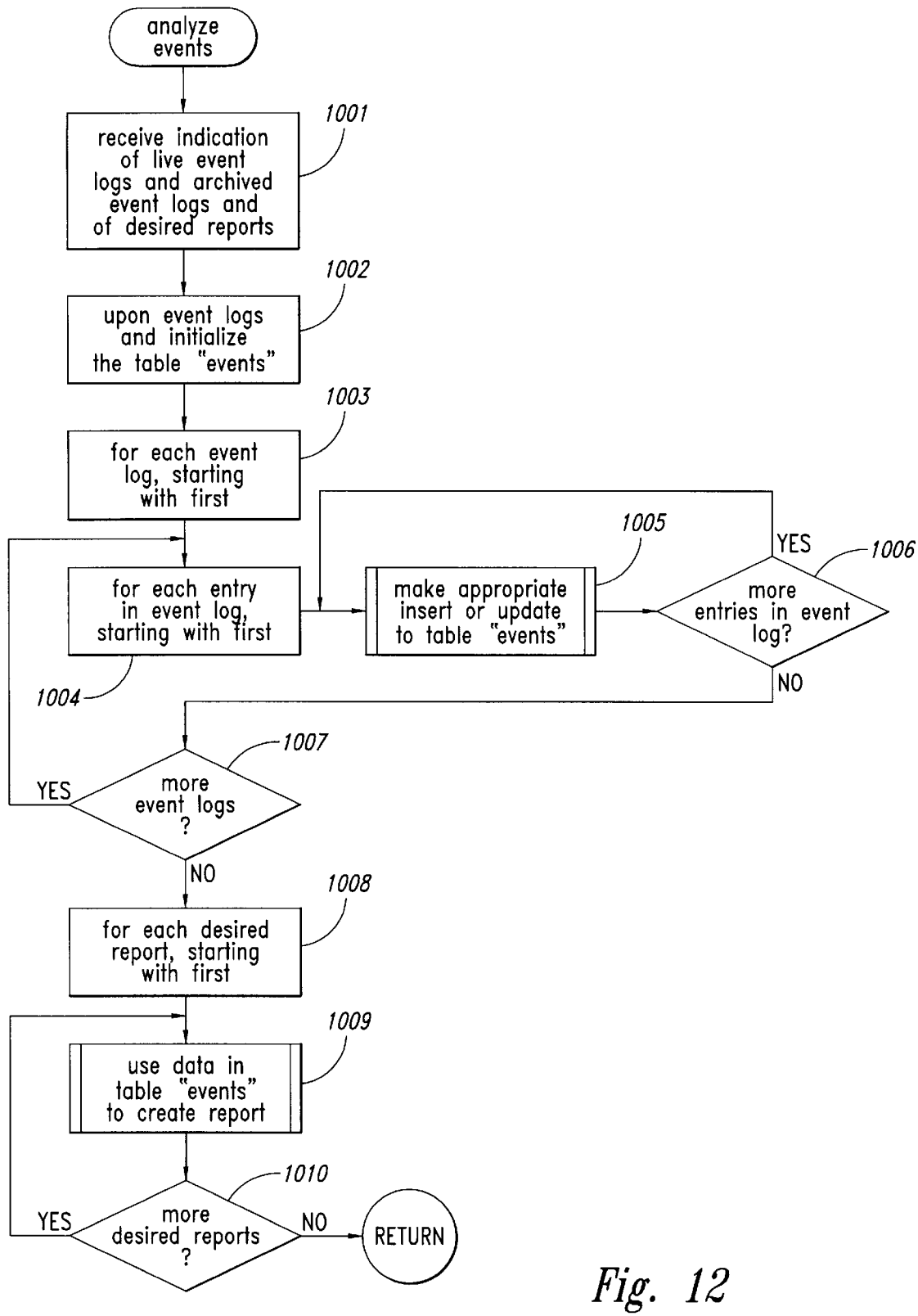
FIG. 12 displays a flow control diagram for the program Analyze Events.

FIG. 12 displays a flow control diagram for the program Analyze Events. The program Analyze Events is one embodiment of the reporting system. Analyze Events collects and compiles data from Event Viewers into the relational database table "Events" and then generates a variety of reports from the relational database table "Events." In step 1001, Analyze Events receives, as calling arguments, indications of the active Event Viewers and archived Event Viewer data files from which it will extract data to generate reports, as well as an indication of the type and number of reports to generate. In step 1002, Analyze Events opens each of the indicated Event Viewers and archived Event Viewer data files and initializes the relational database table "Events" to contain no rows.

Steps 1003–1007 represent a loop, in each iteration of which Analyze Events collects data from a single Event Viewer entry or archived Event Viewer data file entry and stores the data into the relational table of "Events." Steps 1004–1006 represent an inner loop contained within the loop represented by steps 1003–1007, in each iteration of which Analyze Events reads a single entry in a particular Event Viewer and makes an insertion or an update to the Events relational database table.

In most cases, Analyze Events will insert a new row into the relational database table "Events" based upon the data retrieved from one entry in an Event Viewer. In some cases, the newly inserted row will be incomplete, and will be completed only after a second event is read from the Event Viewer. For example, when Analyzed Events processes entry 309 of FIG. 3 in step 1005, Analyze Events inserts row 1011 into the Events relational database table. However, Analyze Events cannot at this point insert values for all of the columns. Entry 309 indicates the initiation of an outgoing call, but does not indicate, by itself, when the call finished, how many bytes of information were transferred and other such information. Thus, upon encountering entry 309 of the Event Viewer output displayed in FIG. 3, Analyze Events, in step 1005, inserts values for the columns User, Date, Port, Time1 and Etype. No values are inserted for null, for rows describing error events. In step 1006, Analyze Events determines whether there are more entries in the Event Viewer. If there are more errors, then control flows to step 1005, where the next entry is processed. If, however, there are no more entries, then control flows to step 1007. In step 1007, Analyze Events determines whether there are any more Event Viewers or archived Event Viewer data files to process. If there are, control returns to step 1004 for processing of the entries in the next Event Viewer. If there are no more Event Viewers, then control flows to step 1008.

Steps 1008–1010 represent a loop, in each iteration of which Analyze Events prepares and prints out or displays one report from among the indicated reports. Report generation in the preferred embodiment is implemented with a relational database report generator. Such report generators use a static template that describes the nature and formatting of the report along with SQL queries to generate the values displayed in the report. Relational database report generators may also allow a user to specify ad hoc queries and receive the results of the queries in printed forms.

The SQL queries, in some cases embedded in short pseudocode routines, used to generate the values included in the example reports of FIGS. 4–9 will be described below. This will fully describe how the data contained in the relational database tables "Events" and "Eventnames" is sufficient to generate the example reports.

The values contained in the Incoming Port Usage Report of FIG. 4 can all be obtained by execution of a single SQL statement:

```
1   SELECT User, Port, Time1, Time2, Total_time, Bytes
2   FROM Events
3   WHERE Etype = 'RAS' AND Enum = 1 AND (((Time2 = < 12:05 AM) AND (Date =
4       9/18/97) OR ((Time2 > = 11:56 PM) AND (Date = 9/17/97)));
``` columns Time2, Total_time, Bytes and Enum. Later, when Analyze Events, in step 1005, encounters entry 310 in the Event Viewer shown in FIG. 3, it updates row 1011 with values for columns Time2, Total_time, Bytes, and Enum. Generally, for error conditions, Analyze Events need only insert a partially completed row as, for example, row 1012 in the Events relational database table that corresponds to where the six Events columns specified in line 1 after the keyword "SELECT"correspond, in order, to the six columns of the Incoming Port Usage report. The Incoming Port Usage Report is thus generated by a single SQL statement embedded within a report template. The values for the Outgoing Port Usage Report of FIG. 5 are analogously generated by the following SQL statement:

```
1   SELECT User, Port, Time1, Time2, Total_time, Bytes
2   FROM Events
3   WHERE Etype = 'SAPS' AND Enum = 1 AND (((Time2 < = 12:05 AM) AND (Date =
4       9/18/97) OR ((Time2 > = 11:56 PM) AND (Date = 9/17/97)));
``` entry 311 in the Event Viewer of FIG. 3. No bytes are generally transferred during an error, nor is there any meaningful elapsed time for an error. Such fields are left blank, or The values for the User Performance Report of FIG. 6 can be generated by the four SQL SELECT statements embedded within the following pseudocode:

```
1    SELECT DISTINCT User FROM Events;
2    for each <selected user>
3    {
4        SELECT COUNT (*), AVG (Total_time), AVG (Bytes)
5        FROM Events
6        WHERE User = <selected user> AND Enum = 1 AND Etype = 'RAS'
7            AND (((Time2 <= 12:05 AM) AND (Date = 9/18/97) OR ((Time2 > = 11:56 PM)
8                AND (Date = 9/17/97)));
9        SELECT COUNT (*), AVG (Total_time), AVG (Bytes)
10       FROM Events
11       WHERE User = <selected user> AND Enum = 1 AND Etype = 'SAPS'
12           AND (((Time2 < = 12:05 AM) AND (Date = 9/18/97) OR ((Time 2 > = 11:56 PM)
13               AND (Date = 9/17/97)));
14       SELECT COUNT (*) FROM Events
15       WHERE User = <selected user> AND Enum ~ = 1;
16   }
``` where the notation "<selected user>" represents the string identifier of a user. The first SELECT statement on line 1 selects all the distinct users for which entries are included in the Events relational database table. Then the statements within a for loop, starting on line 2, are executed for each of those distinct users. The second, third and fourth columns of the User Performance Report are generated for each user by the second SQL SELECT statement on line 4. The fifth, sixth and seventh columns of the User Performance Report are generated by the third SQL SELECT statement on line 9, and the final column of the User Performance Report is generated by the fourth SQL SELECT statement on line 14. Each iteration of the for loop generates values for one entry of the User Performance Report of FIG. 6.

All of the values displayed within the Access Denied Report of FIG. 7 can be generated using the following SQL statement:

```
1    SELECT E.User, E.Date, E.Time1, EN.Name
2    FROM Events E, Eventnames EN
3    WHERE E.Enum = EN.enum AND E.Etype = 'SAPS'
4        AND (E.Enum = 13 OR E.Enum = 9);
```

The values displayed in the first three columns of the Access Denied Report are taken from the Events relational database and the values for the final column of the Access Denied Report are taken from the Eventnames relational database table.

The number of concurrent connections for a given time interval can be obtained using the following pseudocode routine with embedded SQL statements:

where the notation "<selected call>" represents the call data for a call returned by the SELECT statement of line 1. The first SELECT statement on line 1 selects all the calls completed during a specified time interval. In this example case, the time interval begins at 11:56 p.m. and ends at 12:05 a.m. Then for each of the calls that were completed during the specified time interval, selected one at a time, all other calls that were completed within the specified time interval are examined to see if they overlapped in time with the selected completed call. The maximum number of overlapping calls detected is then the result sought for display in the bar graph of FIG. 8.

The data displayed in the bar graph of FIG. 9 can be obtained with the following pseudocode routine with embedded SQL statements:

```
1    SELECT DISTINCT Port
2    FROM Events;
3    for each <selected port>
4    {
5        SELECT SUM (Bytes)
6        FROM Events
7        WHERE Enum = 1 AND Port = <selected port>
8            AND (((Time2 < = 12:05 AM) AND (Date = 9/18/97) OR
9                ((Time2 > = 11:56 PM) AND (Date = 9/17/97)));
10   }
```

The first SQL SELECT statement on line 1 selects all the different ports included in entries within the specified time interval. The for loop starting at line 3 then iterates through each of these selected ports and determines the total number of bytes transferred to that port during the specified time interval.

```
1    SELECT DISTINCT User, Port, Time1, Time2
2    FROM Events
3    WHERE Enum = 1 AND (((Time2 < = 12:05 AM) AND (Date = 9/18/97) OR ((Time2 > =
4        11:56 PM) AND (Date = 9/17/97))):
5    max = 0
6    for each <selected call>
7    {
8        result = SELECT COUNT (*)
9        FROM Events
10       WHERE (Time1 > = <selected call>.Time1 AND Time1 < = <selected call>.Time2)
11           OR (Time 2 > = <selected call>.Time2 AND Time2 < = <selected call>.Time2);
12       if (result > max) max = result;
13   }
```

Although the present invention has been described in terms of one embodiment, it is not intended that the invention be limited to this embodiment. Modifications within the spirit of the invention could be apparent to those skilled in the art. For example, the information collected by Analyze Events from Event Viewers could be stored in any number of different types of databases and in many different ways. As another example, many different alternative types of reports can be generated by the present invention. The formats for the reports need only be specified within a report template and the SQL statements that extract the data for the reports need to be specified. Additional types of event collecting software could be used in place of the Event Viewer. The scope of the present invention is defined by the claims that follow.

What is claimed is:

1. In a networked computer system, a method for producing reports about system usage, the networked computer system having a network server computer connected through physical ports to modems within a shared modem pool and connected to networked computers by a local area network, the modems connected to a telephone network and receiving incoming calls from the telephone network and transmitting outgoing calls to the telephone network, the network server computer having a receiving component that receives incoming calls from the modems and connects users making those incoming calls to the local area network so the users can send data to some networked computers attached to the local area network, the network server computer having a transmitting component that collects outgoing calls through the local area network via logical ports originating from networked computers attached to the local area network and directs those outgoing calls to the modems, the network server computer having an event viewer component that collects information from the receiving and transmitting components about both incoming and outgoing telephone calls, system and modem use, and error conditions, the method comprising:

collecting information about incoming and outgoing telephone calls, system and modem use, and error conditions over a time interval using the event viewer component;

archiving a portion of the collected information in archive files;

extracting the collected information both from the event viewer component and from the archive files;

placing the extracted information into a database; and generating the reports based on information in the database.

2. The method of claim 1 wherein the database in which the extracted information is placed is a relational database, and wherein the reports are generated by using a relational database report generator and stored report templates.

3. The method of claim 1 wherein the receiving component is a remote access server program and the transmitting component is a Sparta-Com asynchronous port sharing program.

4. A method of producing reports about incoming calls received by modems and transmitted to a server computer, the server computer attached to a local area network and configured to allow some remote computers originating the incoming calls to send data to some computers attached to the local area network, the reports further about outgoing calls collected by the server computer originating from local area networked computers and transmitted by the server computer to the modems, the method comprising:

collecting information about both incoming and outgoing calls using an event viewer component;

archiving a portion of the collected information in archive files;

when collected information to be reported is stored within the event viewer component, extracting the collected information from the event viewer component;

when collected information to be reported is stored within archive files, extracting that collected information from the archive files; and generating the reports from the extracted information.

5. The method of claim 4 wherein the extracted information is stored in a database prior to generation of the reports.

6. The method of claim 5 wherein the database is a relational database.

7. The method of claim 6 wherein the server computer has a report template for each type of report to be generated and wherein each report is generated by a relational database report generator by executing queries directed to the database and by formatting the query results into a report based on the report template that corresponds to the type of the report.

8. The method of claim 4 wherein the reports include an incoming port usage report that lists, for each incoming call during a specified time interval, the user that made the call, the physical port of the server computer through which the incoming call was received, the time that the call began and the time that the call ended, the time duration of the call, and the number of bytes transferred to the server computer during the call.

9. The method of claim 4 wherein the reports include an incoming port usage report that includes information about incoming calls processed by the system within a specified time interval.

10. The method of claim 9 wherein the incoming port usage report lists, for each incoming call during a specified time interval, the user that made the call, the physical port of the server computer through which the incoming call was received, the time that the call began and the time that the call ended, the time duration of the call, and the number of bytes transferred to the server computer during the call.

11. The method of claim 4 wherein the reports include an outgoing port usage report that includes information about outgoing calls processed by the system within a specified time interval.

12. The method of claim 11 wherein the outgoing port usage report lists, for each outgoing call during a specified time interval, the user which initiated the call, the physical port of the server computer through which the outgoing call was transmitted, the time that the call began and the time that the call ended, the time duration of the call, and the number of bytes transmitted by the networked computer during the call.

13. The method of claim 4 wherein the reports include a user performance report that includes information about incoming calls received and outgoing calls transmitted by each user within a specified time interval.

14. The method of claim 13 wherein the user performance report lists, for each user that made an incoming call or that transmitted an outgoing call during a specified time interval, and identification of the user, the number of incoming calls made by the user, the average time duration of the incoming calls made by the user, the average number of bytes transmitted during the incoming calls made by the user, the number of outgoing calls transmitted by the user, the average time duration of the outgoing calls transmitted by the user, the average number of bytes transmitted during the outgoing calls transmitted by the user, and the number of errors associated with modem use generated by the user.

15. The method of claim 4 wherein the reports include an access denied report that includes information about errors within a specified time interval associated with the denial by the system of modem access to a user.

16. The method of claim 15 wherein the access denied report includes, for each error associated with the denial by the system of modem access to a user, and indication of the user, the date and time of the denial, and a brief description of the problem that caused the denial.

17. The method of claim 4 wherein the reports include a concurrent connections report that displays the maximum number of concurrent connections to modems provided by the system during specified time intervals.

18. The method of claim 4 wherein the reports include a throughput report that indicates the number of bytes transferred through each modem during a specified time interval.

19. A system for producing reports about incoming calls received by modems and transmitted to a server computer, the server computer attached to a local area network and configured to allow some remote computers originating the incoming calls to send data to some computers attached to the local area network, the reports further about outgoing calls collected by the server computer originating from local area networked computers and transmitted by the server computer to the modems, the system comprising:

an event viewer component that collects information about both incoming and outgoing calls and optionally archives a portion of the collected information in archive files;

a data extraction component that extracts data about incoming and outgoing calls from the event viewer component and, optionally, from archive files;

a database component that stores data extracted by the data extraction component; and a report generation component that generates reports from the extracted data stored in the database component.

20. The system of claim 19 wherein the database component is a relational database management system.

21. The system of claim 20 including a report template for each type of report to be generated and wherein each report is generated by a relational database report generator by executing queries directed to the database and by formatting the query results into a report based on the report template that corresponds to the type of the report to be generated.

22. A system for producing reports about incoming calls received by modems and transmitted to a server computer, the server computer attached to the local area network and configured to allow some remote computers originating the incoming calls to send data to some computers attached to the local area network the reports further about outgoing calls collected by the server computer originating from local area networked computers and transmitted by the server computer to the modems, the system comprising:

a remote access server component that funnels incoming calls through a local area network from the modems to the server computer;

an asynchronous port sharing component that collects outgoing calls from networked computers over the local area network;

an event viewer component that collects information about both incoming and outgoing calls from the remote access server component and from the asynchronous port sharing component;

a data extraction component that extracts data about incoming and outgoing calls from the event viewer component;

a database component that stores data extracted by the data extraction component; and a report generation component that generates reports from the extracted data stored in the database component.

23. The system of claim 22 wherein the database component is a relational database management system.

24. The system of claim 23 including a report template for each type of report to be generated and wherein each report is generated by a relational database report generator by executing queries directed to the database and by formatting the query results into a report based on the report template that corresponds to the type of the report to be generated.

25. A computer-readable medium containing computer instructions that direct a computer to produce reports about incoming calls received by modems and transmitted to a server computer and about outgoing calls collected by the server computer from networked computers and transmitted by the server computer to the modems by:

collecting information about both incoming and outgoing calls using an event viewer component;

optionally archiving a portion of the collected information in archive files;

when collected information to be reported is stored within the event viewer component, extracting the collected information from the event viewer component;

when collected information to be reported is stored within archive files, extracting that collected information from the archive files; and generating the reports from the extracted information.

* * * * *